(12) United States Patent
Mathes et al.

(10) Patent No.: US 10,633,233 B2
(45) Date of Patent: Apr. 28, 2020

(54) PALLET JACK ASSEMBLY

(71) Applicants: James Mathes, Chariton, IA (US); Justin Mathes, Chariton, IA (US)

(72) Inventors: James Mathes, Chariton, IA (US); Justin Mathes, Chariton, IA (US)

( * ) Notice: Subject to any disclaimer, the term of this patent is extended or adjusted under 35 U.S.C. 154(b) by 0 days.

(21) Appl. No.: 16/009,449

(22) Filed: Jun. 15, 2018

(65) Prior Publication Data

US 2018/0370778 A1 Dec. 27, 2018

Related U.S. Application Data

(60) Provisional application No. 62/524,138, filed on Jun. 23, 2017.

(51) Int. Cl.
*B66F 9/16* (2006.01)
*B66F 9/065* (2006.01)
*B62B 3/06* (2006.01)

(52) U.S. Cl.
CPC ............. *B66F 9/165* (2013.01); *B62B 3/06* (2013.01); *B66F 9/065* (2013.01); *B62B 2203/20* (2013.01); *B62B 2203/24* (2013.01); *B62B 2205/30* (2013.01)

(58) Field of Classification Search
CPC .. B66F 9/165; B62B 2205/30; B62B 2203/24
See application file for complete search history.

(56) References Cited

U.S. PATENT DOCUMENTS

| | | | | |
|---|---|---|---|---|
| 3,786,952 A | * | 1/1974 | Nearman | B66F 9/145 414/666 |
| 8,979,099 B1 | * | 3/2015 | Ellis | B66F 9/142 280/43.12 |
| 9,751,161 B2 | * | 9/2017 | Stewart | B23K 37/0294 |

* cited by examiner

*Primary Examiner* — Saul Rodriguez
*Assistant Examiner* — Willie Berry, Jr.
(74) *Attorney, Agent, or Firm* — McKee, Voorhees & Sease, PLC (57) ABSTRACT

A pallet jack includes forks which can be removably attached to the base for positioning in a horizontal use position or a vertical storage position. The base includes forwardly open sockets for receiving the forks in the use position and upwardly open sockets for receiving the forks in the storage position. A lock mechanism locks the wheels in the use position. In an alternative embodiment, the base is eliminated, with each fork having an actuator for raising and lowering the fork wheels.

16 Claims, 13 Drawing Sheets

PALLET JACK ASSEMBLY

CROSS-REFERENCE TO RELATED APPLICATIONS

This claims priority to Provisional application U.S. Ser. No. 62/524,138, filed on Jun. 23, 2017, which is herein incorporated by reference in its entirety.

FIELD OF THE INVENTION

Invention relates to jacks having a pair of forks for lifting loaded pallets, and particularly, to a pallet jack wherein the forks can be moved between a horizontal use position and a vertical storage position, and wherein the forks have self-contained actuators for raising and lowering the forks.

BACKGROUND OF THE INVENTION

Pallet jacks are well-known for moving products that are stacked upon pallets. There are many types of pallet jacks which can be utilized, depending upon the application. A manual pallet jack is often used to move pallet loads to and from the back of a truck, such as a semi-trailer. These jacks are often transported and stored in the truck so as to be available for loading and unloading of the palletized products. However, in prior art manual pallet jacks, the legs or forks are fixed and extend horizontally from the tower or base and take up substantial and valuable space in the truck during transport and/or storage.

Conventional pallet jacks utilize an actuator in the base and connect it to the forks to raise and lower the forks. These actuators add bulk to the base, thus requiring additional storage room for the pallet jack.

Therefore, a primary objective of the present invention is the provision of the pallet jack having removable forks which can be moved between a horizontal use position and a vertical storage position.

Another objective of the present invention is a provision of a manual pallet jack having removable forks.

A further objective of the present invention is the provision of a pallet jack having forks which can be quickly and easily attached and detached for use and storage.

Still another objective of the present invention is the provision of a pallet jack having an actuator in each fork to raise and lower the forks.

Yet another objective of the present invention is the provision of a pallet jack having a lock mechanism to lock forks in a raised or lowered position.

Another objective of the present invention is the provision of a pallet jack that can be moved between use and storage positions by one person.

Still another objective of the present invention is the provision of a pallet jack having actuators in the forks for raising and lowering the forks.

Another objective of the present invention is the provision of a pallet jack which eliminates the bulky and heavy base, with a handle connected directly to the forks.

Another objective of the present invention is the provision of a pallet jack wherein controls are provided in the forks for raising and lowering the forks.

These and other objectives become apparent from the following description of the invention.

SUMMARY OF THE INVENTION

In one embodiment, the pallet jack of the present invention includes a base or tower with support wheels and a hydraulic jack system. A handle is connected to the tower. A pair of forks are removably mounted to the tower for movement between a horizontal use position and a vertical storage position. The tower has horizontal sockets for receiving the forks in the use position and vertical pockets for receiving the forks in the storage position. In another embodiment, the tower is eliminated, and the handle is connected directly to the forks. The forks each have wheels which can be raised and lowered via an actuator in each fork. The forks also include a lock pin that can be extended and retracted to secure the wheels in the raised and lowered positions.

DETAILED DESCRIPTION OF THE INVENTION

Figure 1:
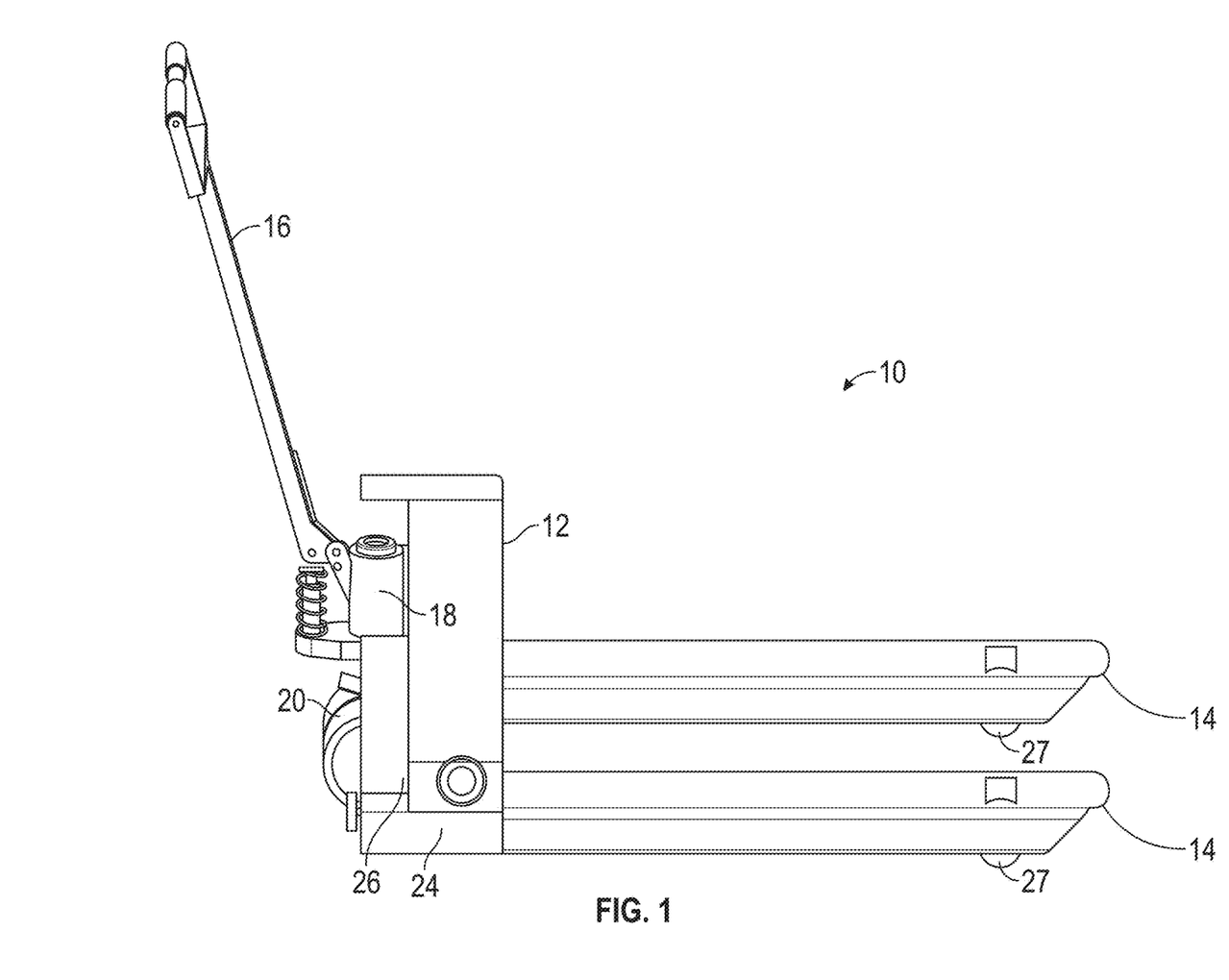
FIG. 1 is a perspective view of one embodiment of the pallet jack of the present invention, with the forks or legs mounted in a horizontal use position extending forwardly from the tower.

A first embodiment of the pallet jack of the present invention is generally designated in the drawings by the reference numeral 10. The pallet jack 10 includes a base or tower 12, a pair of forks or legs 14, and a handle 16. One or more wheels 20 are provided on the base 12. The handle 16 is connected to the tower 12. The pallet jack 10 includes a conventional hydraulic system 18 connected to the handle 16 so as to raise and lower the forks 14 when the forks are in the horizontal use position. The hydraulic system 18 for the pallet jack 10 is conventional and does not form a part of the present invention.

Figure 2:
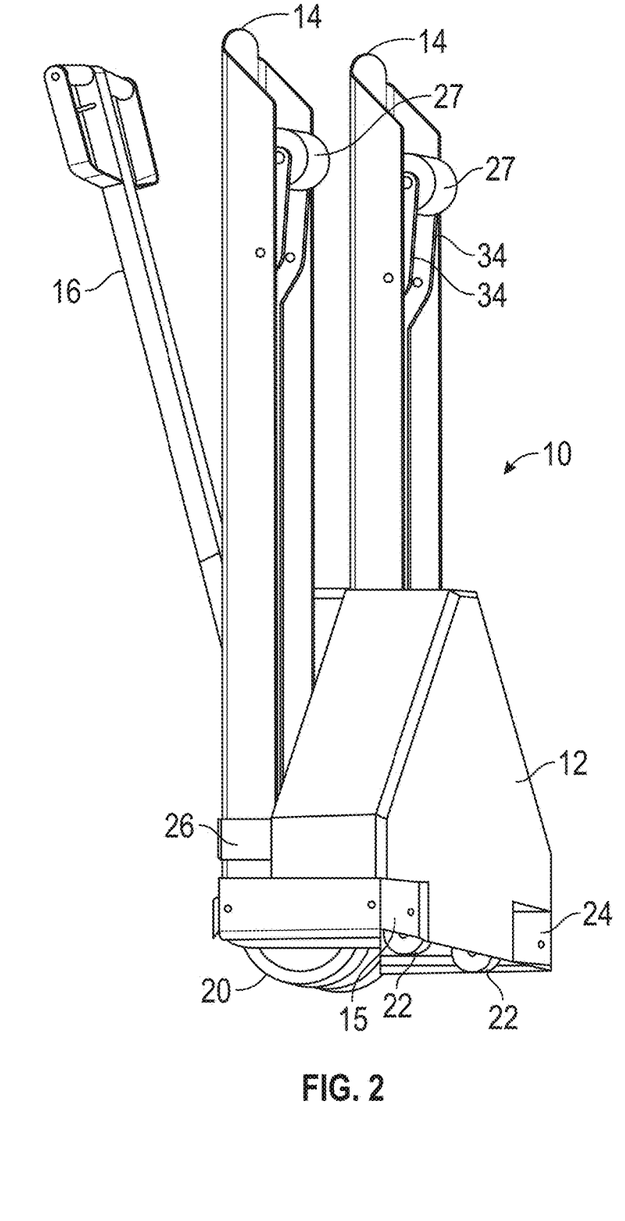
FIG. 2 is a perspective view of the first embodiment of the pallet jack, with the forks or legs mounted in a vertical storage position on the tower.
Figure 3:
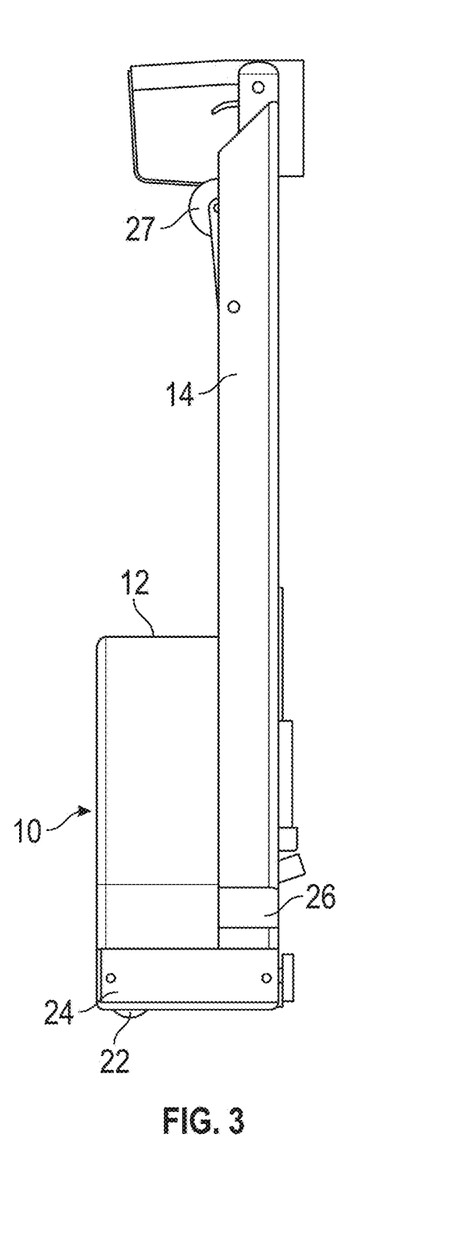
FIG. 3 is a side elevation view of the pallet jack assembly of FIG. 2 with the forks removed and placed in the storage position.
Figure 4:
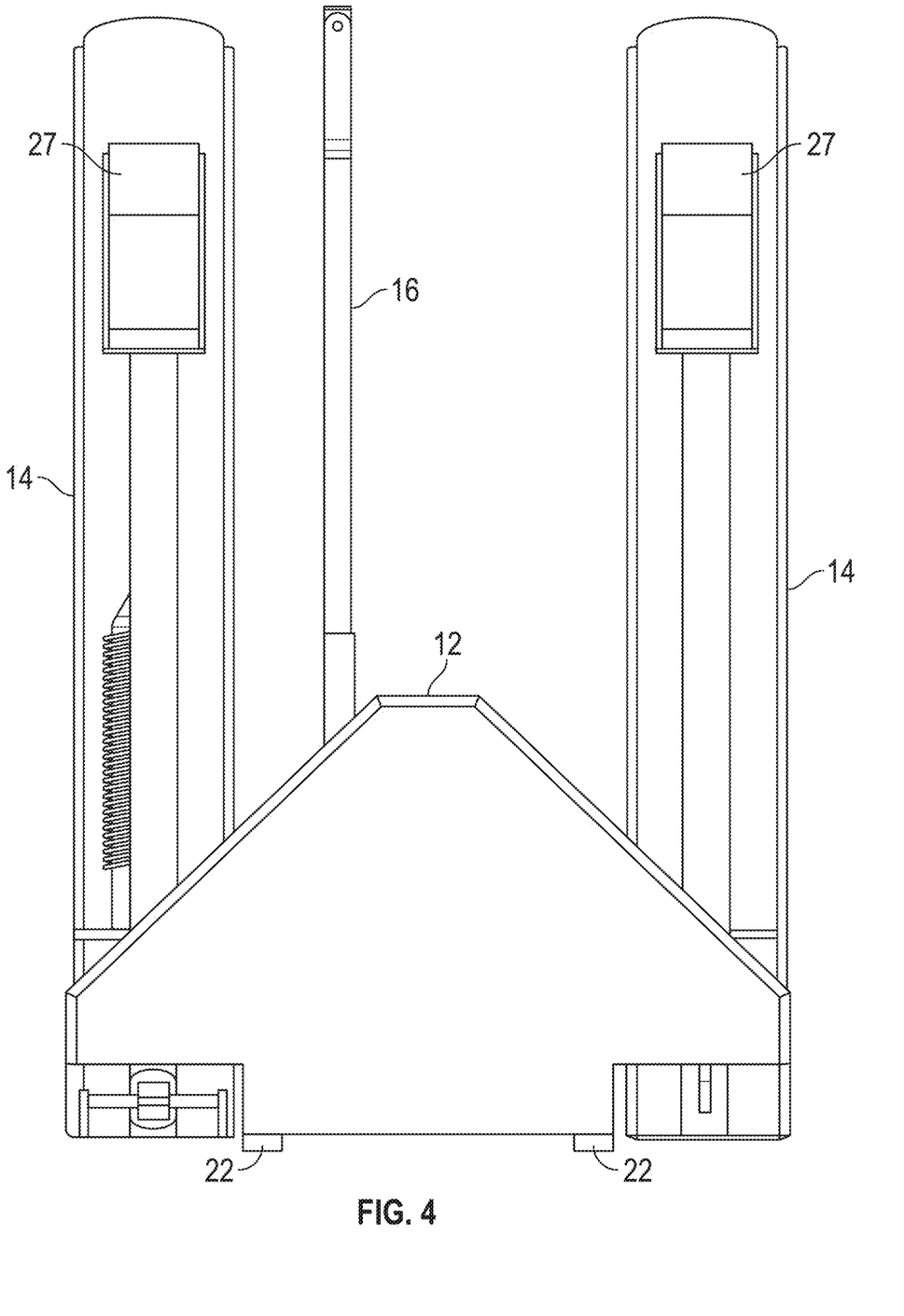
FIG. 4 is a front elevation view of the pallet jack assembly of FIG. 2 with the forks removed and placed in the storage position.

The forks 14 can be moved between a horizontal, forwardly extending use position, as shown in FIG. 1, and a vertical storage position, as shown in FIG. 2. The front of the tower or base 12 includes a pair of sockets 24 for receiving a rearward end of the forks 14. The tower 12 also includes a second pair of sockets 26 to receive one end of the forks 14 and to hold the forks 14 in an upright position, as shown in FIG. 2. Preferably, the storage sockets or compartments 26 are on the rear of the tower 12, but alternatively, can be located on the sides or front of the tower. A lock mechanism is provided to retain the forks 14 in the sockets 24. The lock mechanism can be unlocked to allow the forks to be removed from the sockets 24.

When the pallet jack 10 is to be used for moving a loaded pallet, the forks 14 are mounted in the front receptacles 24 so as to extend horizontally forward. The forks 14 can be lowered for insertion into the pallets and raised for lifting the pallets using the hydraulic system of the jack 10. The forks 14 can be removed from the front sockets 24 and re-positioned in the vertical sockets 26 for storage of the pallet jack 10, either in or out of a truck or other vehicle. The tower 12 includes an additional set of wheels 22 to maintain the tower 12 in an upright position when the forks 14 are removed from the front sockets 24. The front ends of the forks 14 also have wheels 28.

It is understood that the male and female orientation of the fork ends, and the sockets can be reversed, wherein the rear ends of the forks have a socket or cavity to matingly receive a stub shaft on the tower. Also, any convenient quick connect system can be used for coupling and un-coupling the forks 14 to the tower 12. For example, various coupling means include, but are not limited to, a Port-A-power cylinder attachment, quick detach hoses, two-stage cylinder lift, and ball rather than roller wheel support for cargo movement.

FIGS. 5-10 show an alternative embodiment of the pallet jack 10A wherein a handle 16A is pivotally connected to the forks 14, without a base 12, and an actuator or lifting mechanism is completely contained in the forks to raise and lower the forks 14. It is understood that the fork-lifting mechanism can also be used on the first embodiment shown in FIGS. 1-4, rather than using the conventional hydraulic system 18.

Figure 5:
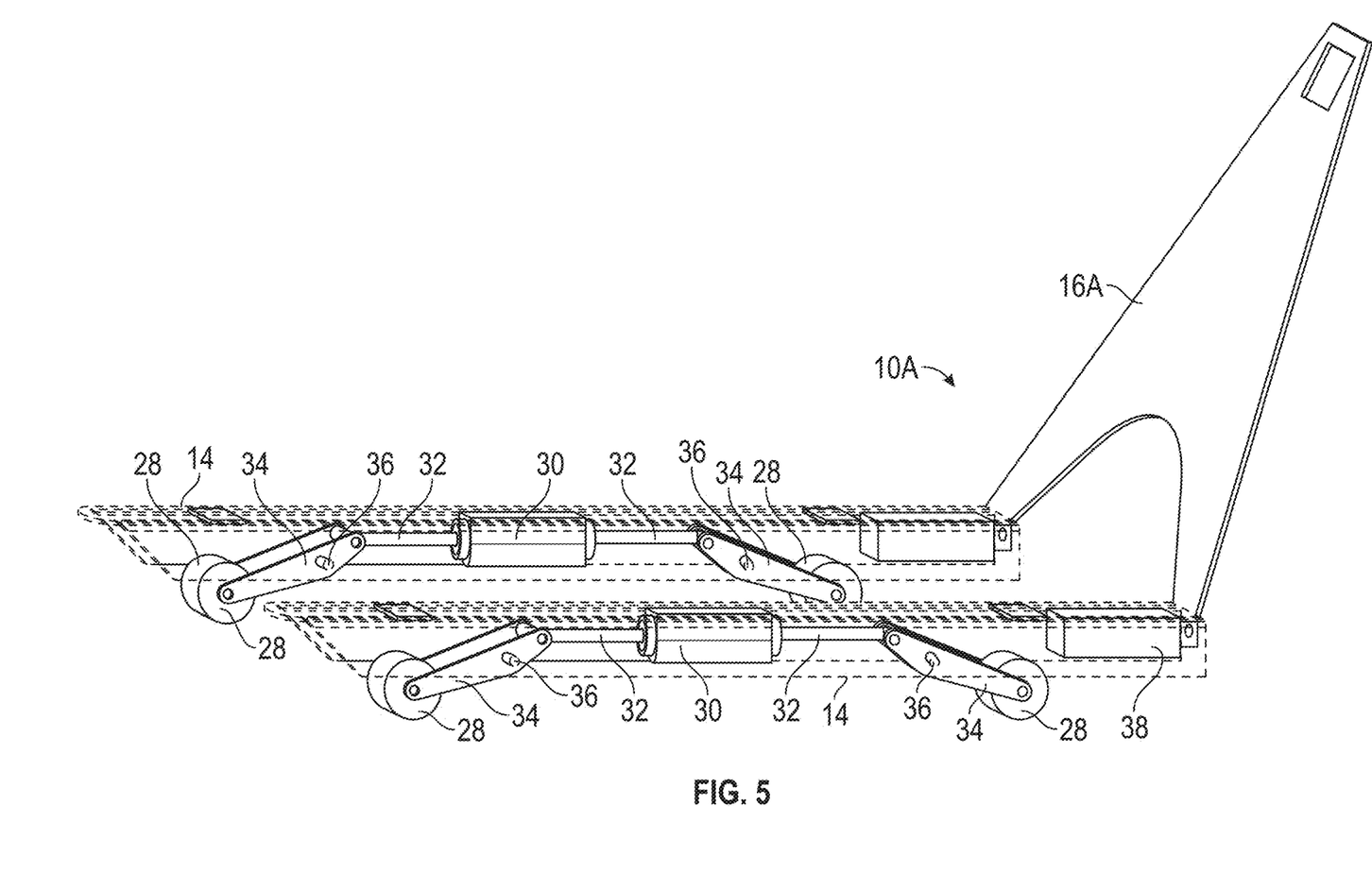
FIG. 5 is a front perspective view of an alternative embodiment of the pallet jack assembly of the present invention, wherein the base is eliminated.
Figure 6:
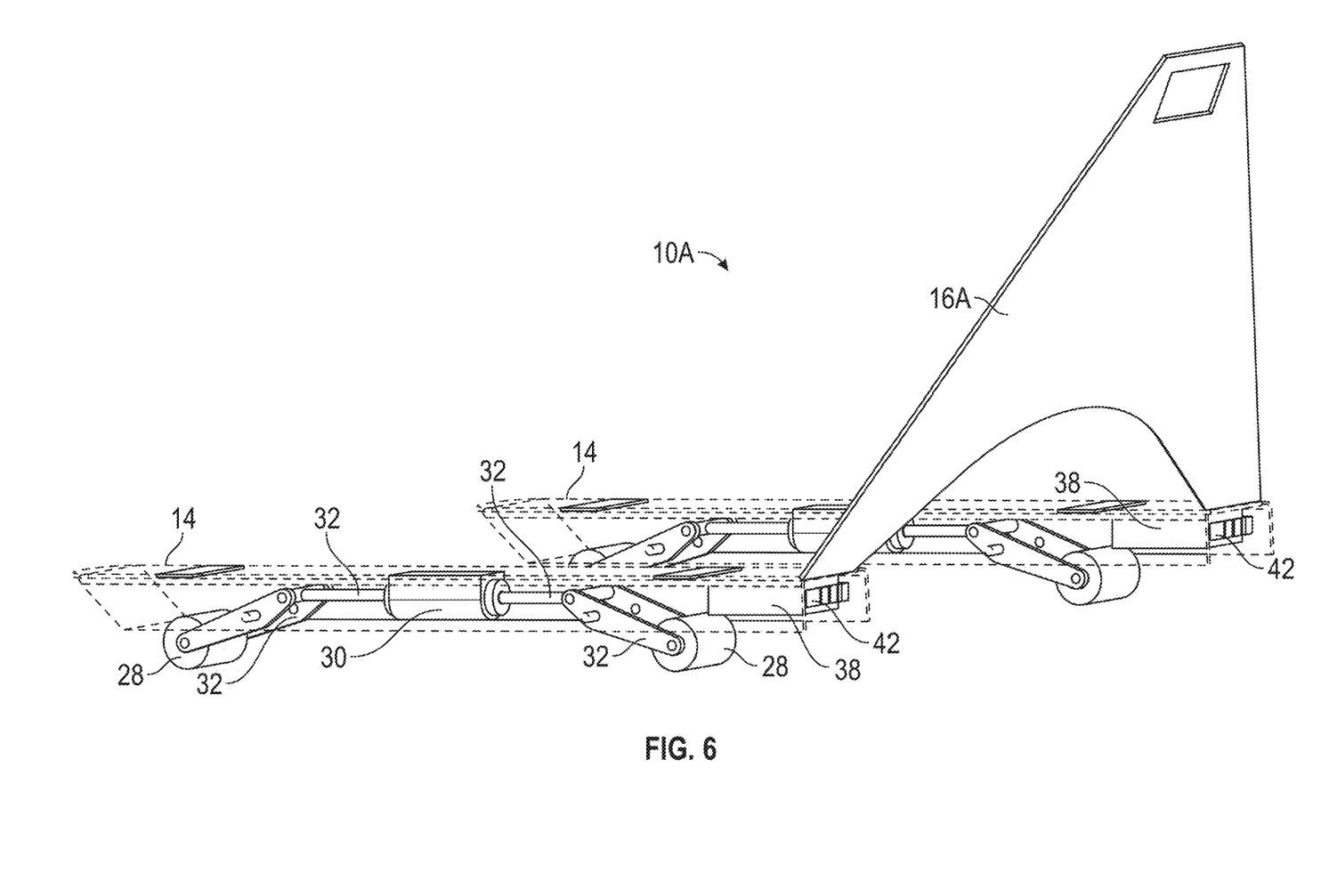
FIG. 6 is a rear perspective view of the power jack assembly shown in FIG. 5.
Figure 7:
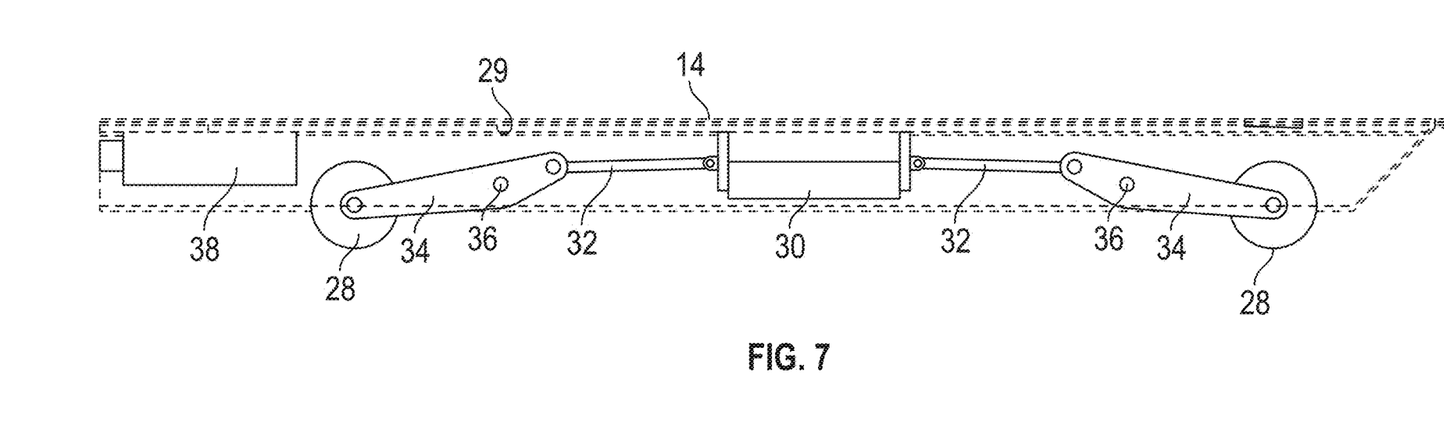
FIG. 7 is a side elevation view of the forks in a lowered position for the pallet jack shown in FIG. 5.
Figure 8:
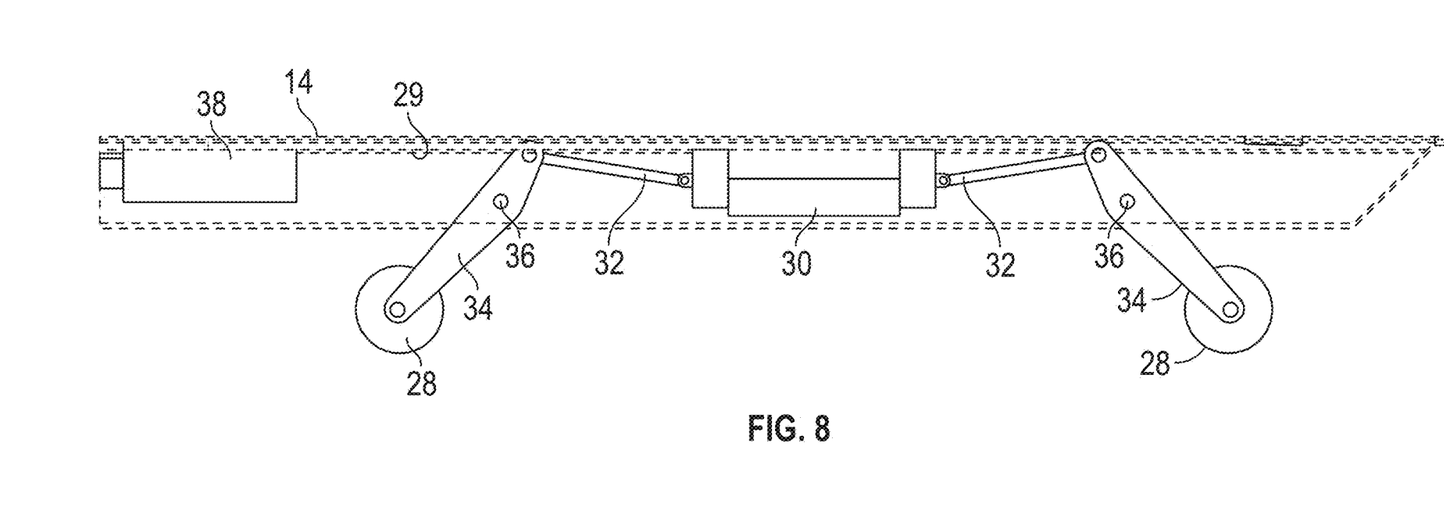
FIG. 8 is a side elevation view showing the forks in a raised position for the pallet jack shown in FIG. 5.
Figure 9:
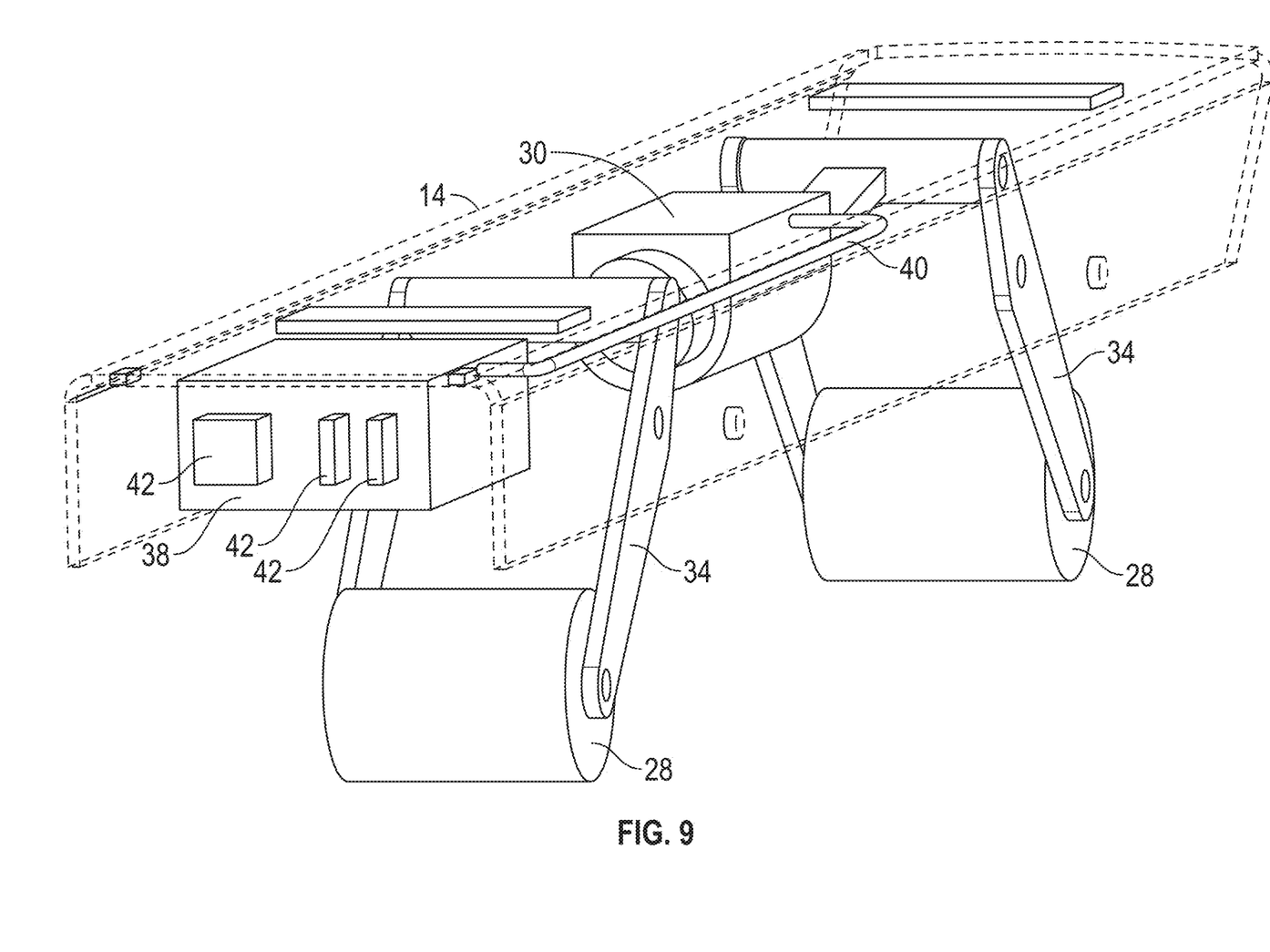
FIG. 9 is a front perspective view of one of the forks of the pallet jack shown in FIG. 5.
Figure 10:
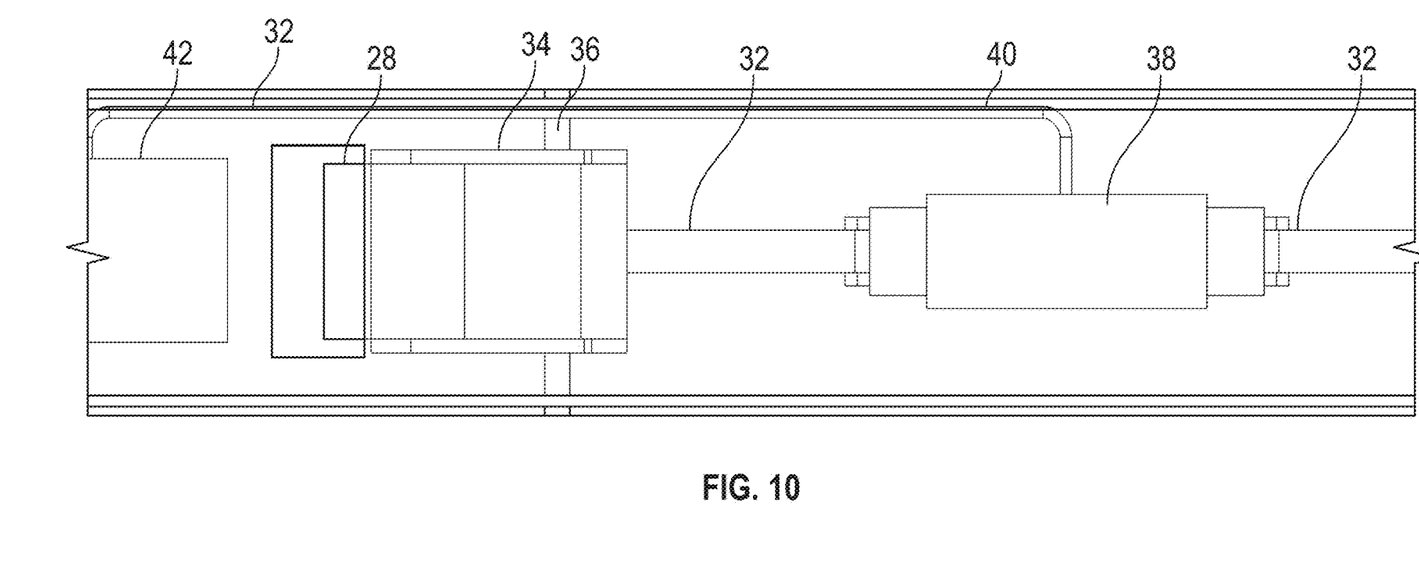
FIG. 10 is an enlarged, bottom plan view of a portion of one of the forks of the pallet jack shown in FIG. 5.

More particularly, the lift mechanism comprises a dual acting cylinder 30 with a rod 32 extending from each end, with the rods being extendable and retractable. The outer end of each rod 32 is connected to a wheel bracket 34 which is pivotally mounted to the fork 14 and which supports the front and rear fork wheels 28. When the rods 32 are retracted, as shown in FIG. 7, the brackets 22 are pulled towards the cylinder 30 such that the bracket 34 pivots about the bracket 10 or axle 26 and thereby raises the wheel 24 relative to the fork 14. When the rods 20 are extended, as shown in FIGS. 5 and 6, the brackets 22 are pushed away from the cylinder 30 so as to pivot around the axle or pin 36 and thereby lower the wheels 28 relative to the forks 14.

The cylinders 30 are actuated by a pump 38 mounted in each of the forks 14. A hydraulic or pneumatic line 40 extends between the pump 38 and the cylinder 30. For example, the pump 38 can be mounted at the rear end of the forks 14, adjacent the handle 16A. The pump 38 can include control buttons 42 for actuating the cylinder 30, and thereby raising and lowering the forks 14. The control buttons 42 can also be positioned on the handle 16A. The cylinders 30 may be a hydraulic or pneumatic cylinder. Alternatively, the actuators 30 may be an electric linear actuator controlled by a reversible electric motor.

The forks 14 of the pallet jack shown in FIGS. 5-10 can be individually maneuvered into position, if needed, and then the handle 16A connected to the forks to allow an operator to move the loaded pallet jack. The handle 16A may include a hydraulic and/or electric interface with the forks. The forks 14 of the pallet jack shown in FIGS. 5-10 can be stored in any convenient manner, including in a horizontal or vertical position, and stacked adjacent one another.

Figure 11:
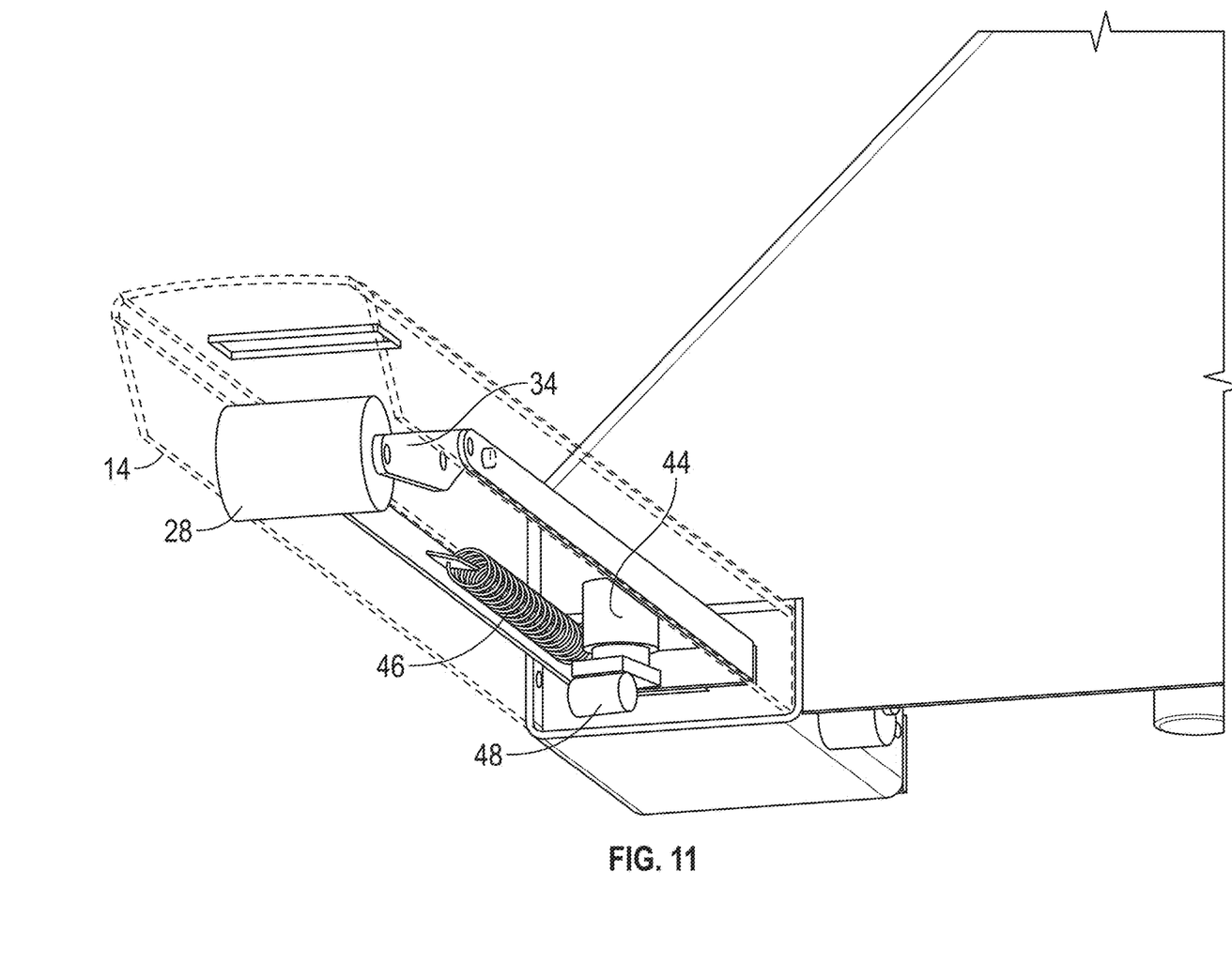
FIG. 11 is a perspective view of an alternative actuator for raising the pallet jack forks of the assembly shown in FIG. 5.
Figure 12:
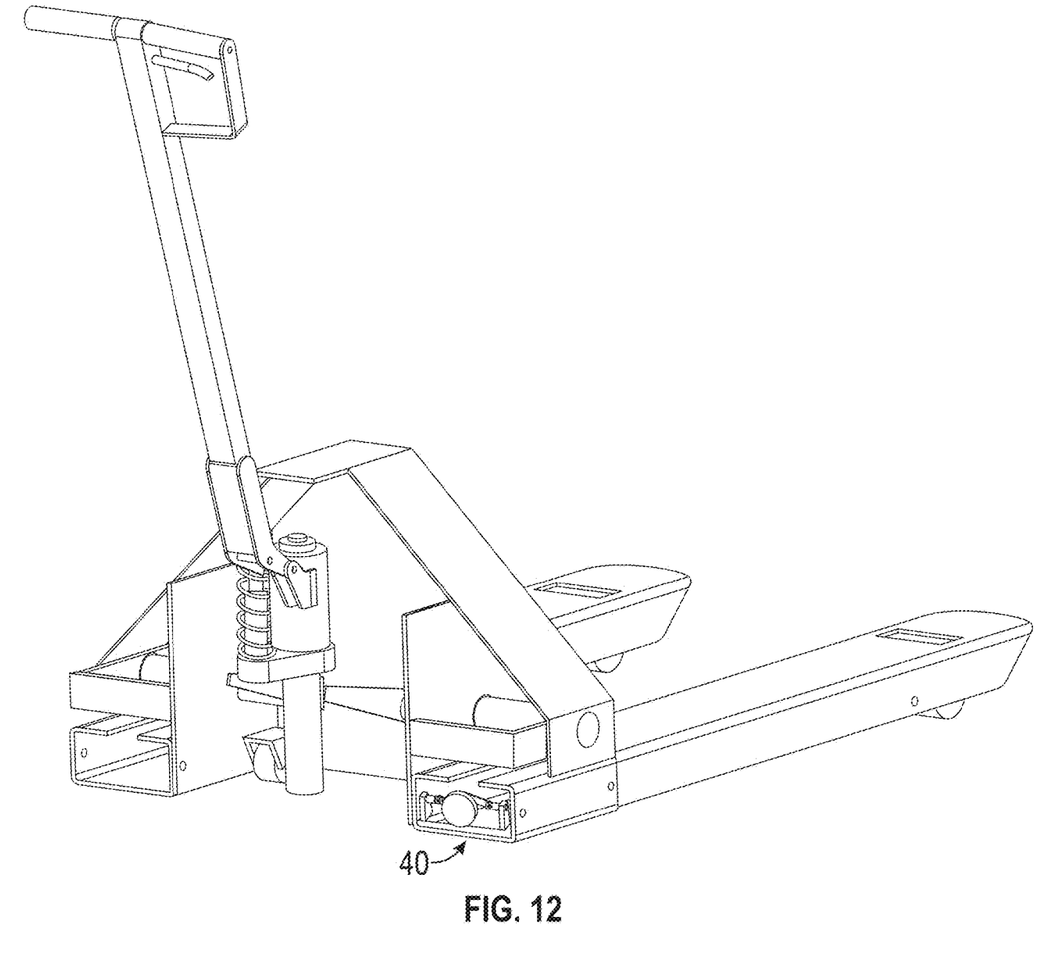
FIG. 12 is a perspective view of the pallet jack assembly of either the first or second embodiment, with an optional lock mechanism provided in the forks.
Figure 13:
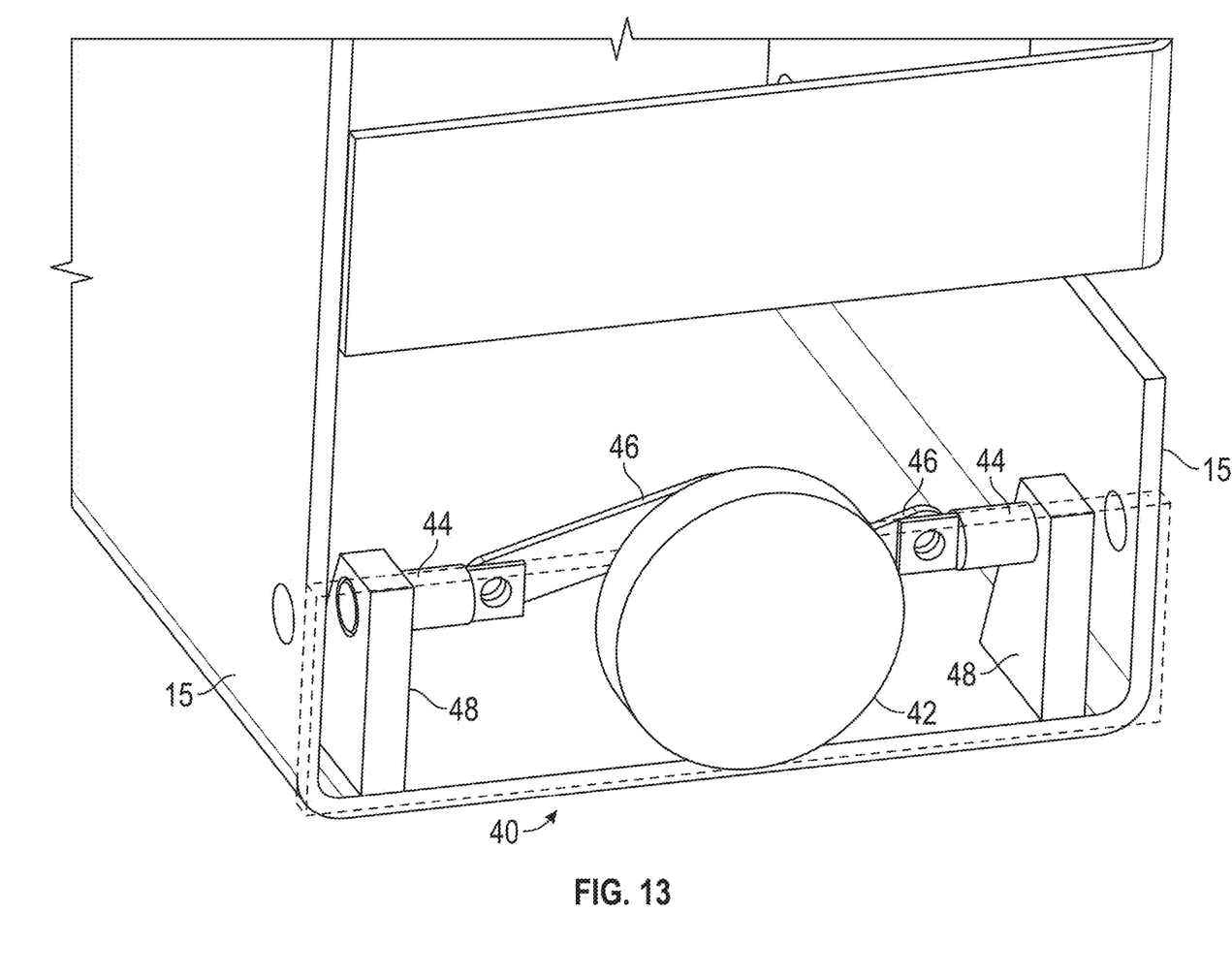
FIG. 13 is an enlarged end perspective view of one fork showing the locking mechanism in an unlocked position, as used on the forks of a pallet jack.
Figure 14:
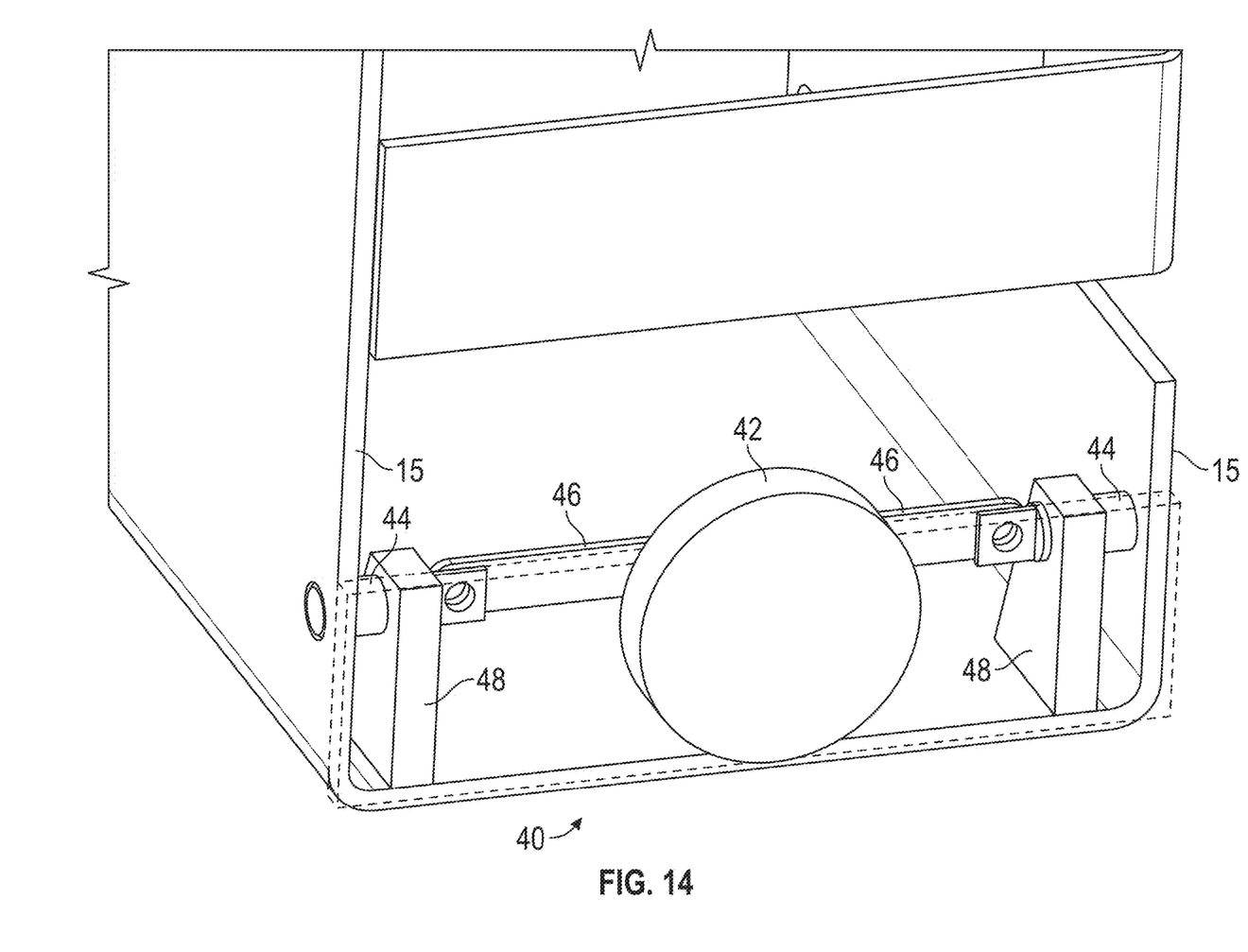
FIG. 14 is a perspective view similar to FIG. 13 showing the locking mechanism in a locked position.
Figure 15:
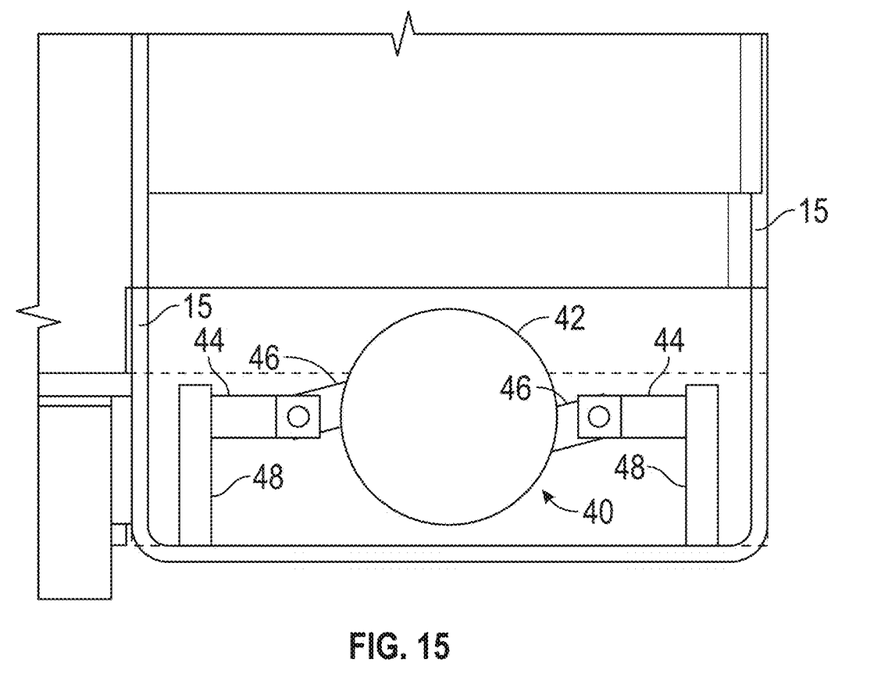
FIG. 15 is an end view of one fork showing the lock mechanism in an unlocked position.
Figure 16:
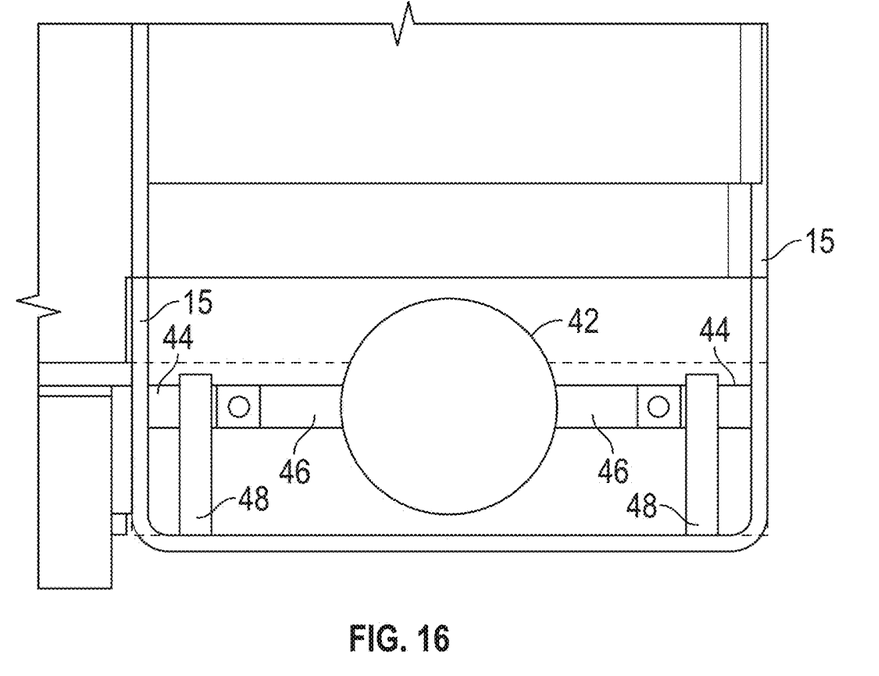
FIG. 16 is an end view similar to FIG. 15 showing the lock mechanism in a locked position.

FIG. 11 shows another alternative lift mechanism for the forks of any of the alternative pallet jacks of the present invention. This actuator includes a reversible, electric motor 44 which can raise and lower the wheels 28, which in turn lowers and raises the forks 14, respectfully. A spring 46 biases the wheels 28 to the raised position, thereby lowering the forks 14. A caster wheel 48 maybe be provided at the rear of the fork 14. The actuator 44 of this embodiment acts vertically, rather than horizontally, to lift and lower the rear-end of the forks.

FIGS. 12-16 show a lock mechanism 50 for the pallet jack 10 to lock the forks 14 in the sockets 24 when the lock is engaged. The lock mechanism 50 includes a reversible, rotatable actuator 52 having opposing pins 54 extending outwardly. When actuator 52 is rotated in a first direction, the pins 54 are retracted linkages 56 such that the lock mechanism 50 is in an unlocked condition. When the actuator 52 is rotated in the opposite direction, the pins 54 are extended through holes in internal legs 58 in the fork and into holes in the sidewalls of the sockets 24, such that the lock mechanism 50 is in a lock condition. The actuator may be rotated manually, or maybe powered, such as an electric motor, for actuation by a switch. The lock mechanism 50 can also be used in a similar manner for the storage sockets to lock the forks 14 in a vertical position.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A pallet jack, comprising:
   a tower having support wheels, a hydraulic jack system, and a handle;
   a pair of forks mounted on the tower;
   the tower and forks have a first male and female coupling for mounting the forks in a use position and a second male and female coupling for mounting the forks in a storage position; and
   the first coupling including a pair of forwardly facing sockets for horizontally receiving inner ends of the forks in the use position and the second coupling including a pair of upwardly facing sockets for vertically receiving the inner ends of the forks in the storage position when the forks are detached from the first coupling.

2. The pallet jack of claim 1 further comprising a first pair of spaced apart wheels on the tower for rolling support and at least one anti-tip wheel to maintain the tower in an upright orientation when the forks are removed.

3. The pallet jack of claim 1 wherein the forks have a self-alignment mechanism to facilitate attachment of the forks to the tower.

4. The pallet jack of claim 1 further comprising a lock to secure the forks to the tower.

5. The pallet jack of claim 1 wherein the tower and forks are decoupled during movement between the first and second couplers.

6. A pallet jack comprising:
a base;
a pair of forks removably mounted in the base, and, each fork having wheels;
a handle connected to the forks;
an actuator housed within each fork to raise and lower each fork; and
the fork having rear ends, and the base and rear ends of the forks having a first male-female coupling for use and a second male-female coupling for storage, with the rear end of the forks being decoupled from the second coupling when in use and decouple from the first coupling when in storage.

7. The pallet jack of claim 6 wherein the actuator includes an extendable and retractable cylinder in each fork.

8. The pallet jack of claim 6 wherein the actuator includes a reversible electric motor in each fork.

9. The pallet jack of claim 6 further comprising a lock in each fork operatively connected to the wheels to lock the wheels against rolling.

10. The pallet jack of claim 6 wherein the actuators are independent from the handle.

11. The pallet jack of claim 6 further comprising a pair of controllers for operating the actuators, each controller being mounted to the forks.

12. The pallet jack of claim 6 further comprising a lock in each fork to lock the fork in a raised position.

13. The pallet jack of claim 12 wherein the lock includes a pin movable between an extended lock position and a retracted unlock position.

14. The pallet jack of claim 6 wherein each wheel is mounted on a pivotal arm for movement between extended and retracted positions.

15. The pallet jack of claim 6 wherein the forks are detached from the base for movement between a horizontal use position on the base and a vertical storage position on the base.

16. The pallet jack of claim 6 wherein the first male-female coupling is a first pair of sockets to receive a rear end of the forks in a use position and the second male-female coupling is a second pair of sockets to receive the rear end of the forks in a storage position.

* * * * *